United States Patent Office.

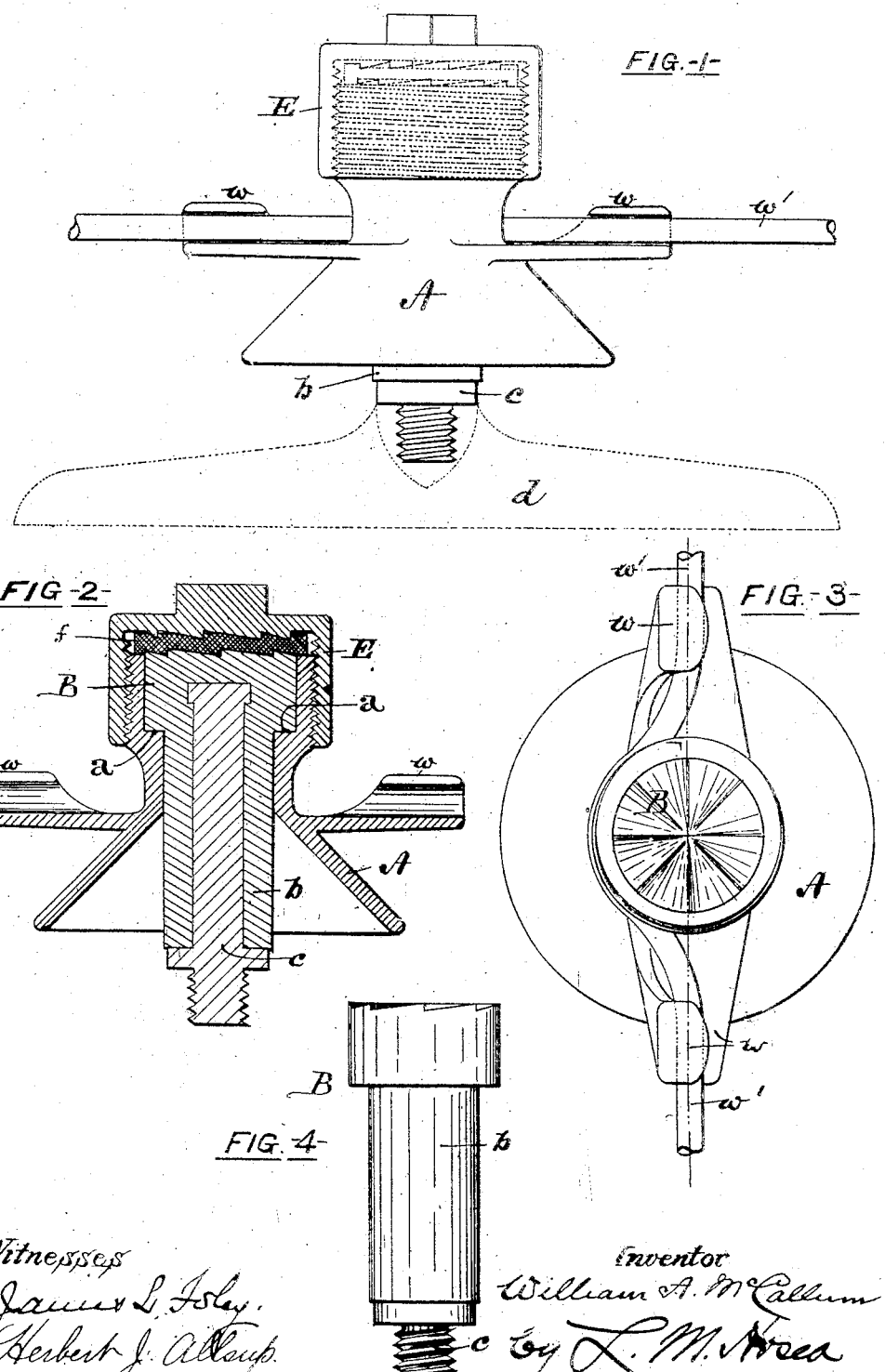

WILLIAM A. McCALLUM, OF CINCINNATI, OHIO.

TROLLEY-WIRE HANGER.

SPECIFICATION forming part of Letters Patent No. 602,463, dated April 19, 1898.

Application filed August 16, 1897. Serial No. 648,394. (No model.)

*To all whom it may concern:*

Be it known that I, WILLIAM A. McCALLUM, a citizen of the United States, residing at Cincinnati, Ohio, have invented new and useful Improvements in Trolley-Wire Hangers, of which the following is a specification.

My invention relates to "hangers" employed in electric-railway service to suspend the ears carrying the trolley-wire from the cross-wires attached to poles. In the structures as heretofore made more or less difficulty has been experienced from the tendency of the parts to become unscrewed and work loose under the constant vibration to which they are subjected. My invention is intended to provide a remedy for this evil and is a simple and practical construction easily made and kept in order; and to this end it consists in the hanger constructed as herein set forth and claimed, in which the principal features of novelty are in providing the hanger-cap and the point of the insulated bolt with oppositely-cut threads, providing the inner face of the hanger-cap and the upper surface of the insulated bolt with radial dentations and interposing between these a compressible washer to form a lock to prevent interrotation under normal conditions, but allow of forcible displacement in taking apart. Thus the insulated bolt is prevented from rotating while in use by the cap, and the cap prevented from rotating by the bolt and compressible washer.

My invention is illustrated in the accompanying drawings, in which—

Figure 1 is a general side elevation of the device complete; Fig. 2, a similar view cross-sectioned to show construction; Fig. 3, a plan view of the device with cap removed, and Fig. 4 a side elevation of the insulated bolt detached.

Referring now to the drawings, A designates the holder or hanger proper, which is in the form of an inverted funnel with an upward cylindrical extension, countersunk interiorly to form a shoulder $a$ to receive and support a bolt B, of hard rubber or other insulating material, embodying a metal stem $c$, projecting below the funnel. The lower end or stem of the insulated bolt is threaded in the usual manner to engage the "ear" $d$, (indicated by dotted lines, Fig. 1,) to which is secured the trolley-wire, as is customary.

The holder may be provided with opposite lateral wings $w$, with grooved seats for engagement of the cross-wire $w'$, or is otherwise suitably provided to suspend the device from the supporting-poles.

The upper surface of the insulated bolt is a little above the upper margin of the holder and is serrated with radial teeth—such, for example, as indicated in the figures—having their inclinations all in the same circumferential direction. Upon the upper cylindrical extension of the holder A is secured a screw-cap E by threads at the interior wall of the cap engaging similar threads at the exterior wall of the extension, the spiral of these threads being inclined oppositely to that of the threads at the lower end of the stem $c$ of bolt B. The inner face of the cap E is provided with teeth corresponding oppositely with those of the insulated bolt, these having such relation to the threads of the cap as that when the latter is screwed home the teeth would prevent back movement if they were in side contact. This function is accomplished by the interposition of a washer $f$ of somewhat elastic material, such as a disk of leather or of rubber, between the cap and the upper surface of the insulated bolt B, which disk, being compressed between the indented surfaces as the surfaces are drawn closer together in screwing down the cap, engages the opposite toothed surfaces and prevents ordinary displacement, yet permits the cap to be taken off when necessary by reverse movement of the parts. It will be seen also that any rotation of the insulated bolt B tending to unseat from the ear $d$ rotates the cap E by the agency of the disk $f$ and causes it to seat more closely on the holder A. Thus the opposite threads of the cap E and of the bolt B, in conjunction with the disk $f$ and the ratchet-teeth of the bolt and cap, serve as a check against displacement either of the cap from the bolt or of the bolt from the ear $d$, while at the same time constituting a simple practical construction easily made and applied.

I claim as my invention and desire to secure by Letters Patent of the United States—

1. In a line-hanger of the character indicated, the combination of the holder; the screw-cap having its inner face provided with teeth or corrugations adapted to engage by backward rotation of the screw-cap; the insulated bolt seated in the holder, and provided with teeth or corrugations corresponding with those of the cap; and the interposed compressible disk, substantially as set forth.

2. The combination of the holder, the insulated bolt seated therein and having a toothed or corrugated upper surface; the screw-threaded cap having a corresponding inner face; the suspending end of the bolt threaded oppositely from the cap; and the compressible washer interposed between the cap and the insulated bolt, substantially as set forth.

In testimony whereof I have hereunto set my hand in the presence of two subscribing witnesses.

WILLIAM A. McCALLUM.

Witnesses:
　L. M. HOSEA,
　HERBERT J. ALLSUP.